H. S. DAILEY.
ENGINEER'S LEVELING ROD.
APPLICATION FILED JAN. 28, 1910.

985,784.

Patented Mar. 7, 1911.
3 SHEETS—SHEET 1.

Witnesses

Inventor
Harry S. Dailey
By Knight Bros
Attorneys

H. S. DAILEY.
ENGINEER'S LEVELING ROD.
APPLICATION FILED JAN. 28, 1910.
985,784.
Patented Mar. 7, 1911.
3 SHEETS—SHEET 2.
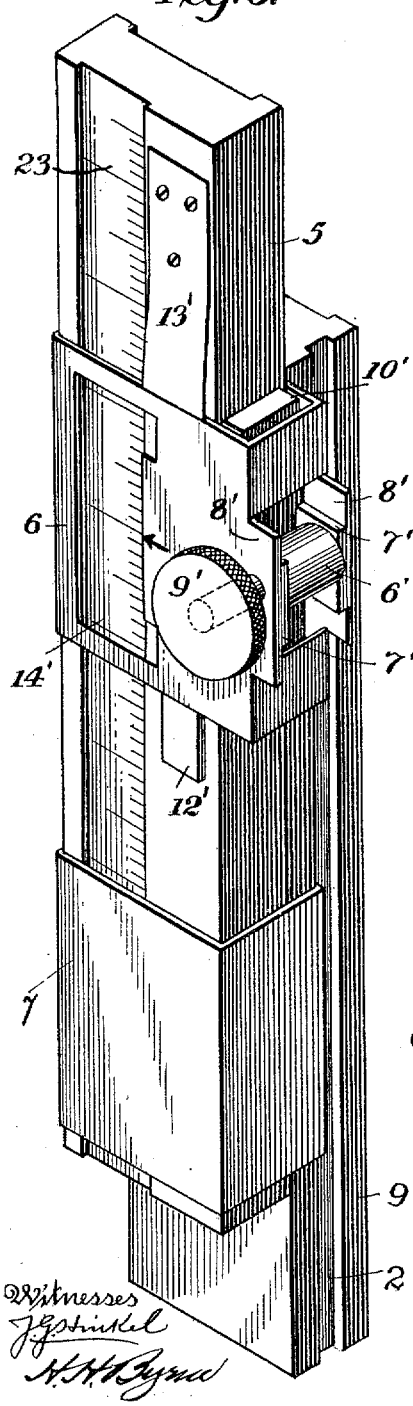
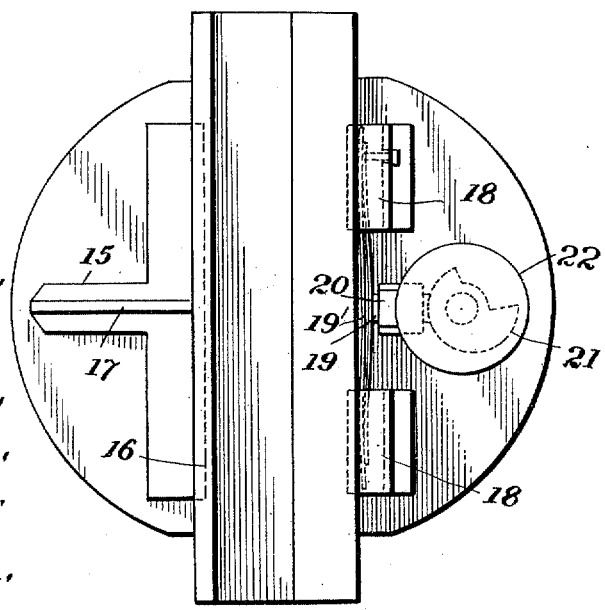
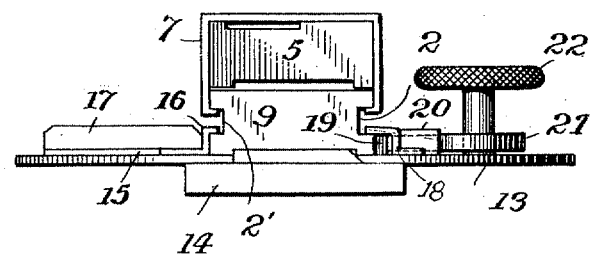
Inventor
Harry S. Dailey
By Knight Bros
Attorneys
Witnesses H. S. DAILEY.
ENGINEER'S LEVELING ROD.
APPLICATION FILED JAN. 28, 1910.
985,784.
Patented Mar. 7, 1911.
3 SHEETS—SHEET 3.
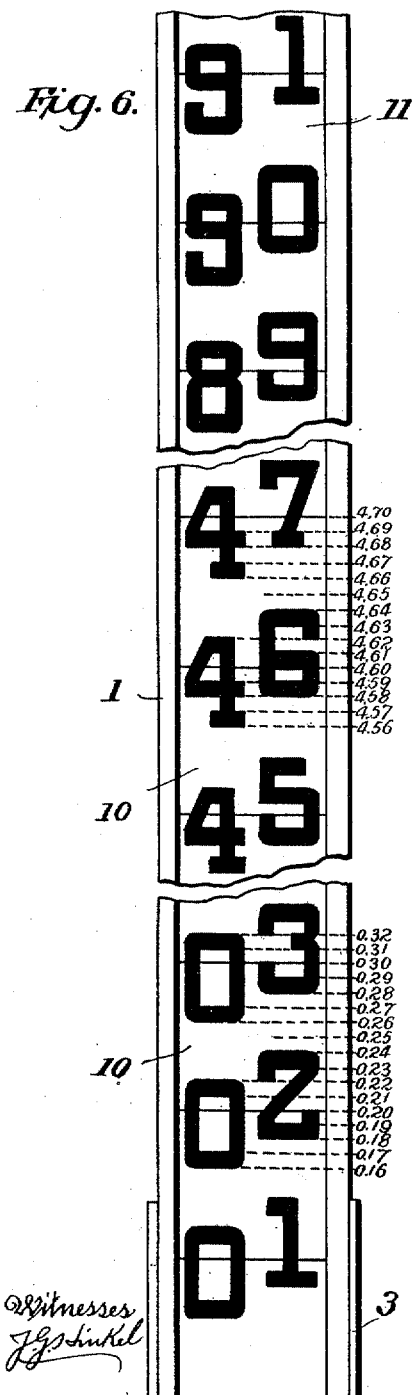
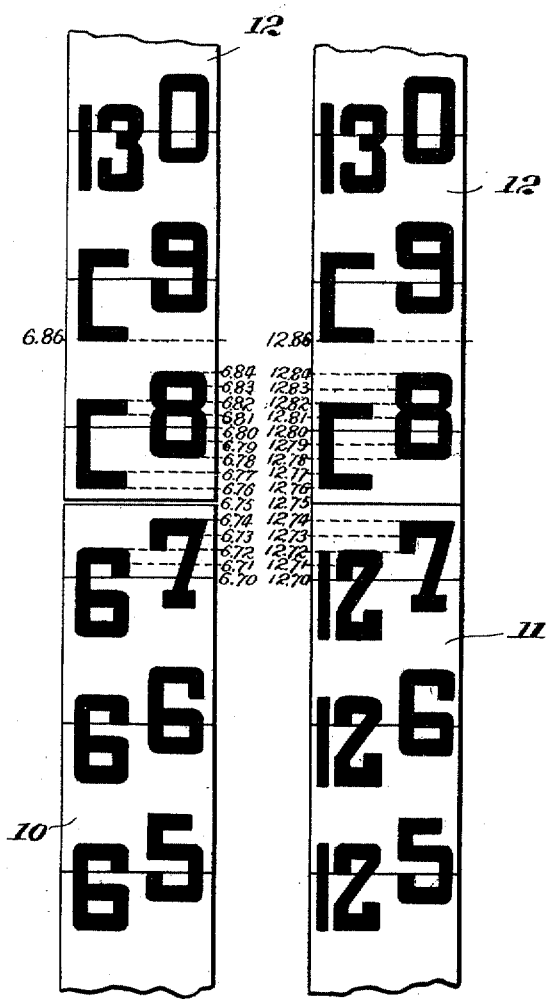
Inventor
Harry S. Dailey
By Knight Bros
Attorneys

UNITED STATES PATENT OFFICE.

HARRY S. DAILEY, OF BELLEFONTAINE, OHIO.

ENGINEER'S LEVELING-ROD.

985,784. Specification of Letters Patent. Patented Mar. 7, 1911.

Application filed January 28, 1910. Serial No. 540,697.

*To all whom it may concern:*

Be it known that I, HARRY S. DAILEY, a citizen of the United States, and resident of Bellefontaine, in the county of Logan and State of Ohio, have invented certain new and useful Improvements in Engineers' Leveling-Rods, of which the following is a specification.

The present invention relates to leveling rods such as employed by surveyors and engineers and particularly to that type of rod known as "extension self-reading rods"; and has for its purpose to provide such an instrument wherein the graduations thereof may be consecutively read whether the rod be in its opened or closed position.

A further purpose of the invention is to provide a leveling instrument of this kind wherein the target is of such structure and is mounted on the rod in such manner that it affords a substantially unobstructed view of the indicia of graduations.

Other advantages consist in that the indicia of graduations are arranged upward and consecutively in feet and tenths thereof, and in the use of such figures and characters as will readily facilitate the reading of the hundredths of a foot, which points constitute in themselves an important advantage in the use of the instrument.

With the foregoing advantages the invention possesses other points of merit which will be described in the course of the following specification and the points of novelty thereof set forth in the appended claims.

Figure 1:
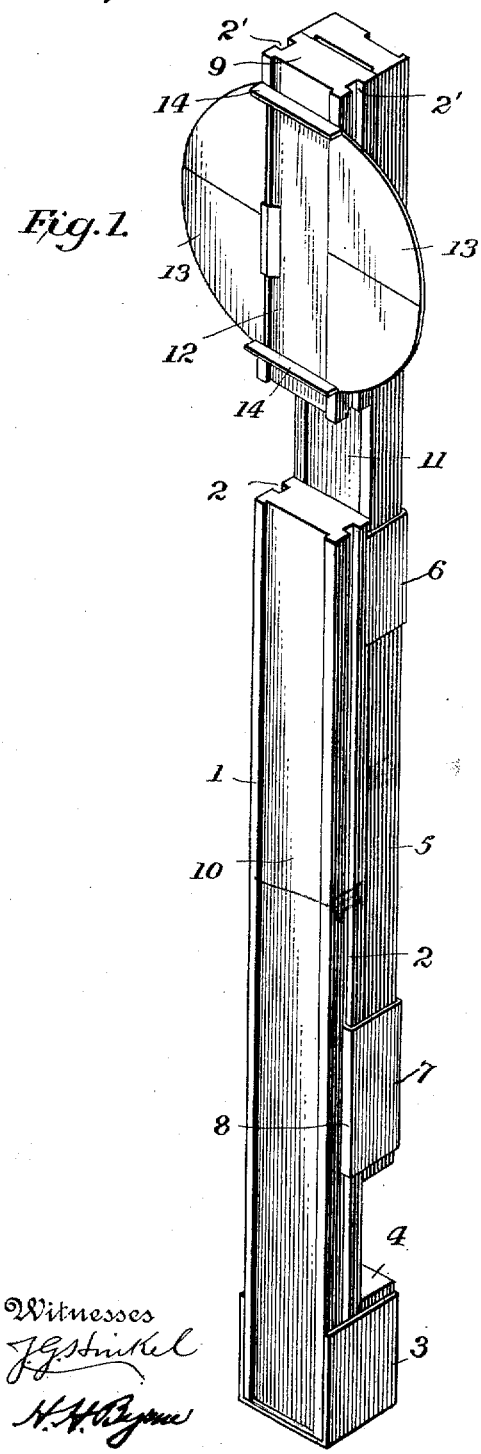
Figure 2:
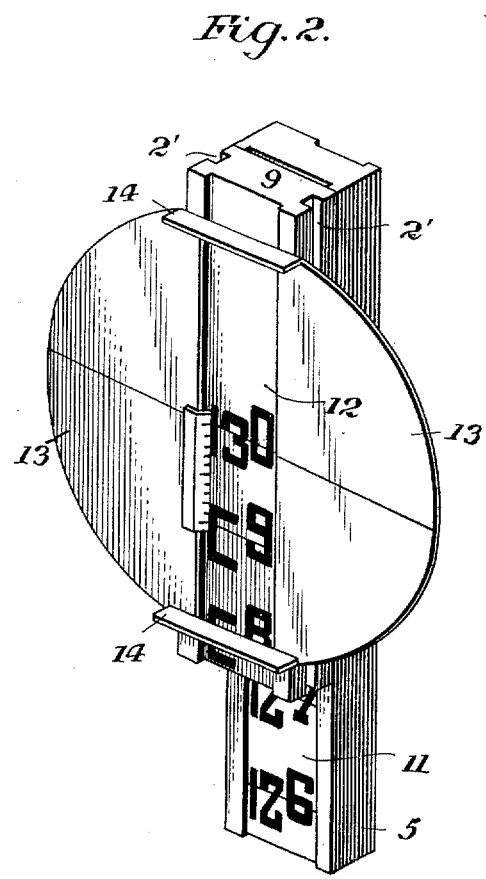

In the accompanying drawings, which show the invention in its preferred structure, Figure 1 is a perspective view of the instrument complete but with the graduations omitted, Fig. 2 is a detail perspective view of the target and the target block, Fig. 3 is a detail perspective view of the locking means for the adjustable section, Fig. 4 is a rear elevation of the target, showing its manner of mounting, Fig. 5 is a top plan view thereof, Fig. 6 is a detail view showing the rod graduations, Fig. 7 is a similar view with the instrument closed, and Fig. 8 is a like view with the instrument extended.

Referring to the several figures in further detail and with like characters of reference indicating corresponding parts in the different views shown, 1 designates the main or stationary member, which is provided on its opposite sides with a pair of longitudinally disposed channels or grooves 2. At its lower end the rod 1 is fitted with a metallic shoe 3, which is suitably secured thereon and retains a block 4, which block constitutes a base for limiting the downward movement of the adjustable section 5 of the instrument. The main member or rod 1 is fitted adjacent its upper end with a retaining band 6 within which the adjustable section 5 is adapted to have freedom of movement, and which also supports the locking means for securing said member 5 in its adjusted position. Said adjustable member 5 is provided adjacent its lower end with a retaining band 7, which has oppositely disposed portions 8 fitting within the two guide-ways 2 of the section 1. The adjustable section 5 carries on its upper and outer face a target block 9 whose cross sectional dimensions are precisely those of the rod 1, whereby the grooves or channels 2' of the block may aline with the corresponding channels 2 of the former member.

The means for locking or holding the adjustable section at any position to which it may be set comprises an eccentric 6' journaled within the plates 7' that are in turn soldered to the flanges 8' which are turned outwardly from the band 6. On its rear end, the eccentric 6' has a manipulating knob 9', and coöperating with said eccentric is a plate or wedge block 10' adapted to contact with one side of the adjustable section 5 and hold the same at such position to which it may be set as will be obvious. For limiting the upward movement of the adjustable section, the same is provided with a stop block 12' and for holding the same at its uppermost adjusted position said section carries a retaining spring 13'. The rear portion of the retaining band 6 is partially cut away as at 14' thus providing a sufficient exposure from which the rod-man may take his readings.

The target comprises two semi-circular plates 13, preferably of metal and which are united at their upper and lower adjacent edges with a pair of metallic strips 14, which strips are disposed endwise and substantially at right angles to the face of the target, whereby they will virtually afford an unobstructed view to the graduations at any position to which said target may be placed on the rod. The means for mounting the target and permitting of its adjustment comprises the plate 15 suitably secured to the rear face of the target and having a retaining portion 16 engaging within one of the journals 2', and for giving its respective section additional rigidity said plate provides a rib or flange 17. Coöperating with this retaining member are two similar engaging elements 18 that have portions lying within the opposite groove 2'. For holding the target in said position, the same is provided with an eccentric and frictional lock arrangement. This locking means consists of a bolt 19 impinging a spring 19' which is mounted within the members 18 and said bolt is supported in a sleeve 20 and receives its movement through an eccentric that is manipulated by the knob 22. By reason of this novel structure of the target and its peculiar manner of mounting it will be readily seen that said target may with the greatest facility be moved vertically upon its immediate support 9 or transferred on to the adjacent section 1 of the instrument. This feature is further useful in that it makes possible the use of two or more targets which would be of great convenience in stadia-work.

The outer faces 10 and 11 of the fixed and movable sections respectively are suitably channeled to receive the indicia of graduations therein and keep the same free from being blurred or otherwise obscured through the ordinary handling of the rod. The corresponding face 12 of the target block 9 is likewise finished whereby the exposed or indicating surface of the instrument may be uniform throughout when the same is in its closed position.

The indicia of graduations, which are arranged on the surfaces 10 and 11 of the instrument, are such that when the adjustable member is distended to its outermost position the indicia on the surface 11 will read consecutively with that on the surface 10 and by reason of the arbitrary characters employed on the surface 12 said characters will likewise read consecutively with those on the adjustable member. The employment of these arbitrary characters, and their manner of division enables the same to be read consecutively with those on the rod 1 when the instrument is closed. When the target is used with the adjustable member either partly or wholly extended, the readings therefrom are taken by the rod-man by the characters on the surface 23, the same being read through the opening 14'.

In using this level rod as self reading it must be used entirely closed, or else extended full length. In the latter case the figures or graduations on the surface 11 of the rod section 5 are so arranged as to make continuous readings the entire length of the rod. Now should the upper section of the rod slip downwardly, due to insufficient clamping it would naturally cause an error in the readings on that part of the rod equal to the amount of such displacement. This likelihood is however guarded against by providing the safety spring 13' which locks against the member 6 and thus holds the section 5 in its uppermost extended position.

The rod shown herein (see Figs. 6, 7 and 8) is graduated in feet, and in tenths and hundredths of a foot. With most of the level rods now employed, there is a figure placed at the end of each foot; and also at each tenth of foot, between the foot figures, is a figure representing the tenth of a foot, while the 1/100 of a foot is read either from additional graduations, or from reference to the special construction of the figures. With the present rod the foot figures are carried along at each and every tenth foot, while the 1/100 part of the foot is readily taken from the lines on the figures themselves, as will be explained below, thus doing away with special graduations: All figures are 6/100 of a foot in height. All horizontal lines are 1/100 of a foot in width. All horizontal spaces are either 1/100 of a foot or some multiple thereof in height. The left hand figure (i. e. the figure indicating the foot) extends 4/100 of a foot below the tenth line, and 2/100 foot above the line. The right hand figure (i. e. the figure indicating the tenth of foot) is placed 2/100 foot below, and 4/100 foot above the line.

By using the tops and bottoms of the figures, the tenth foot is divided into five equal parts, reading all the "even" hundredths, while the "odd" hundredths are found by reading to the upper or lower side of the horizontal lines, as shown by the dotted lines. Thus:—Horizontal line at each tenth foot equals "0" hundredth. Lower side top line left hand figure is always 1/100 foot. Top of left figure is always 2/100 foot. Lower side top line right figure is always 3/100 foot. Top of right figure is always 4/100 foot. Midway between top of right figure and bottom of left figure next above is always 5/100 foot. Bottom of left figure is always 6/100 foot. Upper side lower line left figure is always 7/100 foot. Bottom of right figure is always 8/100 foot. Upper side lower line right figure is always 9/100 foot. Then comes horizontal line, or tenth line which is 0/100 foot. And so on throughout the entire length of the rod.

Having thus described my invention, what I claim as new therein and desire to secure by Letters Patent is:—

1. The combination with a leveling rod having indicia of graduations thereon, of a target adjustably mounted on the rod, said target comprising two semi-circular metallic plates sufficiently spaced apart for their full length to expose the graduations and united by strips of relatively thin metal turned edgewise whereby to not obstruct said graduations at any of the adjusted positions of the target.

2. The combination with a leveling rod having a column of indicia of graduations thereon, of a target adjustably mounted on the rod, said target comprising two semi-circular members spaced apart for their full length and at a distance substantially equal to the width of the column of indicia, and united at their end portions by relatively thin material turned edgewise whereby the target affords a substantially unobstructed view of the indicia on the rod at any of the adjusted positions of said target.

3. A leveling rod comprising a main section, a section movable upon and relatively to the main section, means for limiting the upward movement of the second section, means for holding said section at its uppermost adjusted position, means for holding said section at other adjusted positions, a target block carried by the movable section and disposed immediately over the main section, said block and main section having alining channels in the opposite sides thereof, a target having movable engagement within said channels, and means for fixing said target at any adjusted position on the rod.

4. A leveling rod comprising a main section having channels longitudinally thereof, a retaining band mounted adjacent the upper end of said section, an adjustable section movable within the retaining band and having means engaging within said grooves, a locking means mounted within said band and adapted to hold the adjustable section in set position, said locking means comprising an eccentric member journaled within the retaining band, and a wedge block coöperating therewith; a target block carried by the adjustable section immediately over the main section and having channels alining with the channels of the main section, and a target having movable engagement, within the channels whereby to be adjusted on the rod.

5. A leveling rod having indicia of graduations thereon, said graduations being arranged with the major characters in a column and having the decimals thereof or minor characters disposed to the right and a little above the major characters, whereby to afford convenient graduations of the hundredth parts of said major characters all of said characters and fractions thereof being on one face of the rod.

6. A leveling rod comprising a main section having channels disposed longitudinally thereof, an adjustable section mounted on said main section and having members movable within said channels, and a target carried by the movable section and having supporting means adapted to move within the grooves of the main section, said grooves being of sufficient width to permit said target supporting means and movable section supporting means to slide past each other therein.

7. A leveling rod having indicia of graduations comprising a main section provided with a retaining band, a second section movable within said band and adjustable relatively to the main section; means for holding the sections in adjusted position, said means comprising an eccentric cam journaled within portions struck from said retaining band, and means reinforcing said struck-out portions, said retaining band being cut-away on its back portion to enable the reading of the rod graduations through said retaining band.

The foregoing specification signed at Bellefontaine, Ohio, this 18 day of January, 1910.

HARRY S. DAILEY.

In presence of—
CHARLES M. RICHEY,
FRED W. MCKINNON.

---

Copies of this patent may be obtained for five cents each, by addressing the "Commissioner of Patents, Washington, D. C."